Dec. 21, 1965 — R. S. SOLOFF ETAL — 3,224,916
SONIC METHOD OF WELDING THERMOPLASTIC PARTS
Filed Dec. 6, 1963 — 2 Sheets-Sheet 1
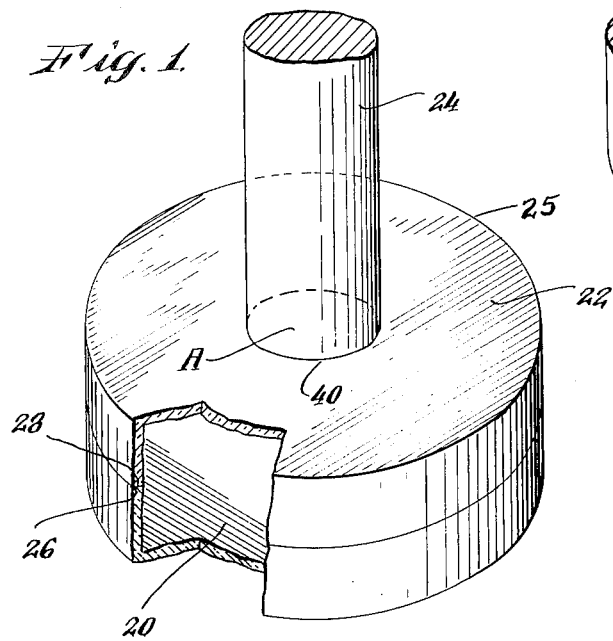
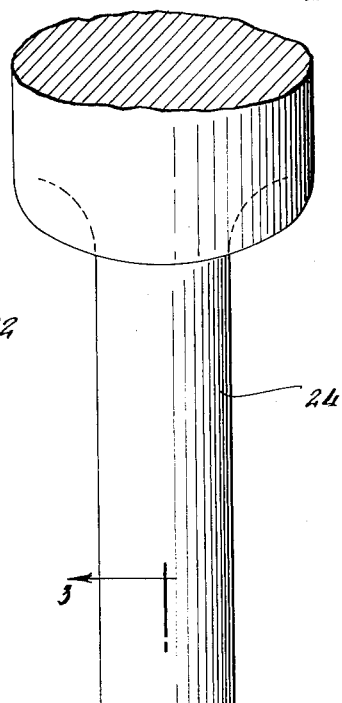
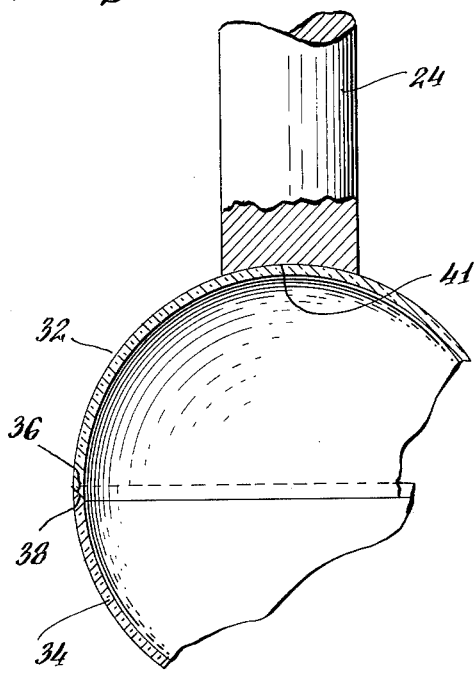
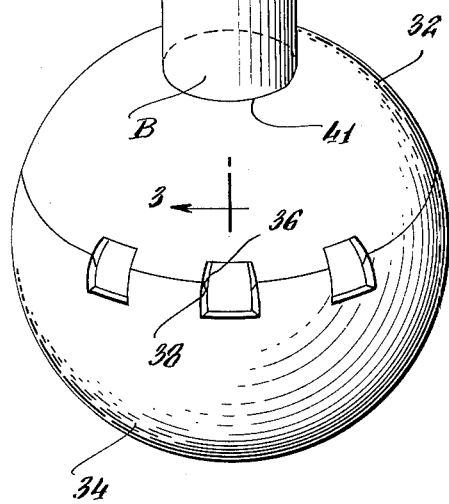
INVENTORS:
Robert S. Soloff
Seymour G. Linsley
BY Blair & Buckles
ATTORNEYS.

Dec. 21, 1965     R. S. SOLOFF ETAL     3,224,916
SONIC METHOD OF WELDING THERMOPLASTIC PARTS
Filed Dec. 6, 1963     2 Sheets-Sheet 2
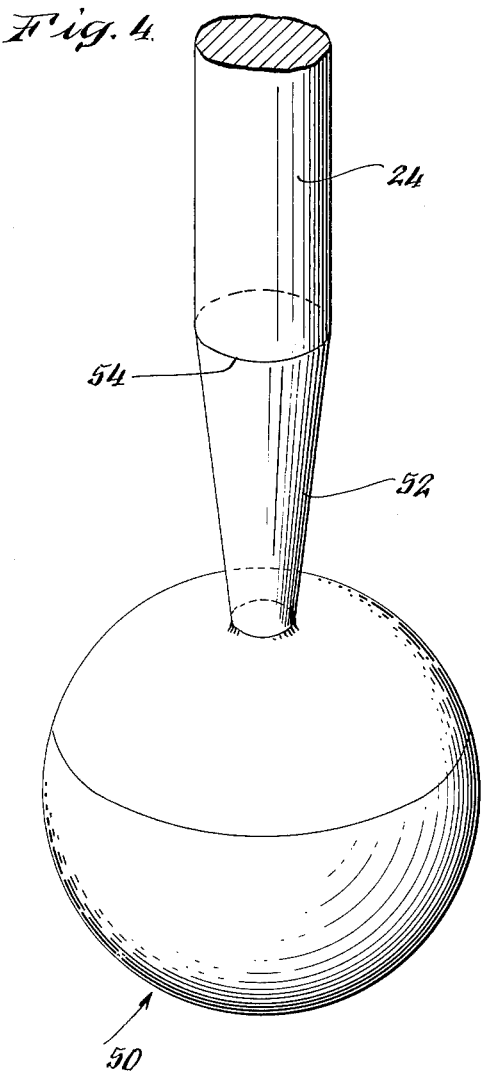
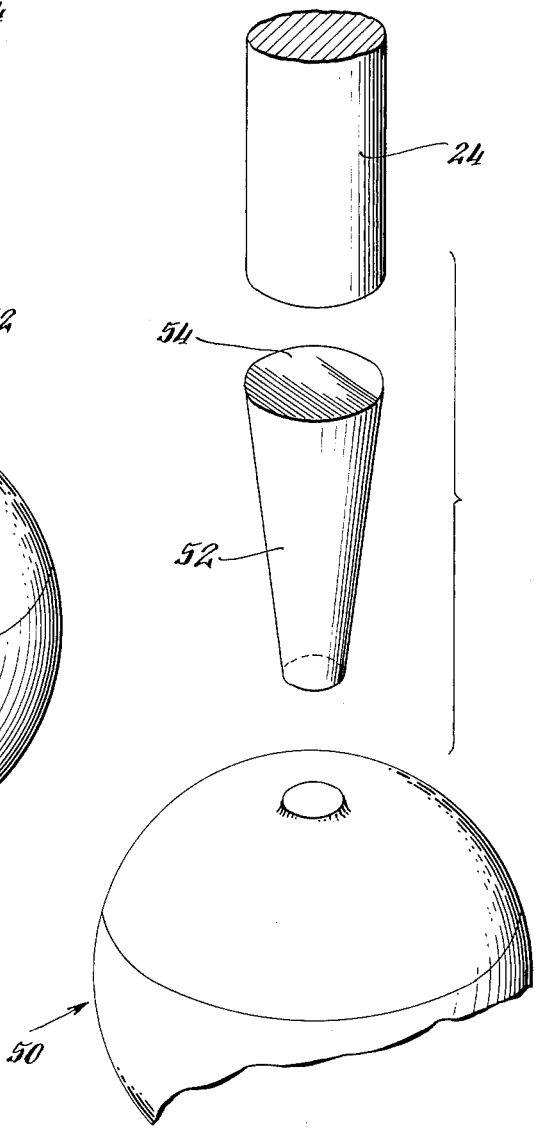
INVENTORS.
Robert S. Soloff
Seymour G. Linsley
BY
Blair & Buckles
ATTORNEYS.

United States Patent Office 3,224,916
Patented Dec. 21, 1965

3,224,916
SONIC METHOD OF WELDING THERMOPLASTIC PARTS
Robert S. Soloff, Stamford, and Seymour G. Linsley, Bridgeport, Conn., assignors, by mesne assignments, to Branson Instruments, Incorporated, a corporation of Delaware
Filed Dec. 6, 1963, Ser. No. 328,500
8 Claims. (Cl. 156—73)

This invention relates to sonics, more particularly, it relates to a sonic method of welding rigid and semi-rigid thermoplastic parts.

In the prior art thin plate-like rigid or semi-rigid thermoplastic parts have been sonically welded together. This has heretofore been done by overlapping flat surfaces of the parts and introducing high intensity sonic energy into the outer surface of the overlapping portion of one of the parts. The parts are thus caused to undergo relative vibratory movement at the interface of their overlapped surfaces. This heats the material at the interface below the sonic energy source and the material melts and flows together to form a weld.

This method has proven generally satisfactory if one of the parts to be welded is of the required thin plate-like configuration, if the desired weld is of an overlapping character as above described, and if additionally the geometry and configuration of the assembled parts permits application of a high intensity sonic energy source to the outer surface of an overlapping portion of one of the parts. Thus, in the prior art special sealing surfaces such as pads, mating flanges, or the like, have been provided for sonic sealing. However, if any one of the above conditions is not met, for example, if the parts are thick, or if it is desired to form a butt weld, or if the assembled parts block access of a suitable high intensity sonic energy source to the outer surface of an overlapping portion of one of the parts, they cannot be sonically welded according to the prior art.

The prior art method is further unsatisfactory when it is desired to seal parts together over a large continuous area or at a large number of localized areas. It is then necessary to either apply a single high intensity sonic energy source successively along the part or to simultaneously apply a plurality of high intensity sonic energy sources to the sealing areas.

When a single high intensity sonic energy source is applied successively to each of the sealing areas, the time required for welding a plurality of assemblies may be excessive. When a plurality of high intensity sonic energy sources are simultaneously applied to the sealing surfaces, special jigs may be required to hold the assembled parts and to position the sources and a plurality of high intensity sonic sources having special tips to conform to the sealing areas may be prohibitively expensive.

The above-described prior art method has also proven unsatisfactory in welding rigid or semi-rigid parts made of difficult-to-melt thermoplastic materials, i.e. thermoplastic materials having relatively high thermal conductivities, or high melting points. The very intense sonic vibrations involving very high power per unit area required to weld such materials may severely burn and permanently scar the part at the surface where the power is introduced. In fact, so far as we know, all prior art sonic fusion welding processes require the application of sonic power per unit area to the surface of the part for a length of time greater than that required to melt that surface. Thus, prior art methods invariably result in some melting and scarring of the part.

Accordingly, an object of the present invention is to provide a sonic method of welding which will obviate the above noted difficulties inherent in the prior art method.

A more specific object of the present invention is to provide a sonic method of welding whereby thermoplastic parts of other than thin plate-like configuration may be welded together.

A further object of the present invention is to provide a sonic method of butt welding.

A still further object of the present invention is to provide a quick and economical sonic method of welding over large continuous areas or at a plurality of sealing areas.

Another object of the present invention is to provide a sonic method of welding parts together at inaccessible interfaces.

Yet another object of the present invention is to provide a sonic method of welding parts made of difficult to weld materials without burning or otherwise damaging the outer surfaces of the parts.

Still another object of the invention is to provide a sonic method of welding selective interfaces of assemblies of thermoplastic parts.

A further object of the invention is to provide a sonic method of welding assemblies of thermoplastic parts without requiring special sealing surfaces such as pads, flanges, and the like.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the accompanying drawings, in which:

FIGURE 1 is a perspective view showing the performance of the method of the present invention, FIGURE 2 is a perspective view, similar to FIGURE 1, showing the performance of the method according to the invention, FIGURE 3 is a cross sectional view taken along the line 3—3 of FIGURE 2, FIGURE 4 is a perspective view of an alternative method according to the invention; and, FIGURE 5 is a perspective view similar to FIGURE 4 illustrating completion of the method shown in FIGURE 4.

Similar reference characters refer to similar elements throughout the several views of the drawings.

We have discovered that the above noted difficulties and shortcomings may be overcome by firmly pressing rigid or semi-rigid thermoplastic parts into intimate contact at the interfaces where it is desired to achieve a weld and thereafter introducing sonic energy into one of the parts over an area of that part remote from any and all of the desired welding interfaces. By so doing, the parts are instantly and simultaneously welded together at the welding interfaces. The welds are achieved substantially irrespective of the nature of the welds to be formed, the size and configuration of the parts, and the accessibility of the welding interfaces.

For example referring to FIGURE 1, when two mating cup-shaped thermoplastic parts 20 and 22 are brought together to firmly press the rim of one part against and in abutting relation to the rim of the other part and a high power sonic source 24 is placed against one of the parts at a location thereon spaced from its rim 25, upon energization of the sonic source the parts are observed to instantly weld together along the entire circumference of the abutting rims.

The method of the present invention has been similarly used to weld together a hollow toy pig formed of two halves mating along a plane passing lengthwise from head to tail through the pig. When these two halves were pressed together and sonic energy introduced into an area on the side of the pig, the two halves were observed to instantly butt weld together along their entire abutting periphery. In a similar application, the two hemispherical halves of a plastic ball were butt welded together along their entire peripheral interface by the introduction of sonic energy into one of the halves substantially at the vertex thereof.

It will be seen from the above examples that the method of the present invention permits sonic butt welding of rigid and semi-rigid thermoplastic parts, a result unobtainable in the practice of the prior art method. It will further be seen from the above examples that the method of the present invention permits the use of one sonic energy source to achieve instantaneous welding of an elongated continuous interface, another result unobtainable according to the prior art method.

While the interfaces along which the parts were sealed in the above examples (such as interfaces 26 and 28 in FIGURE 1) were substantially continuous, the new method is also effective to simultaneously seal two parts together at a plurality of separate and distinct interfaces. Thus, referring to FIGURE 2 containers 30 comprised of upper and lower parts 32 and 34 each having a plurality of sealing surfaces 36 and 38 each conforming to a respective sealing surface on the other part have been welded together according to the present invention by clamping the parts together at each of their sealing interfaces and pressing a single sonic source 24 against an area of one of the parts remote from any of their interfaces. In one such instance involving the welding together of the upper and lower parts of a container the method of the present invention uses one sonic source where four were required by the prior art method.

The method of the present invention has also been used in welding an upper part having a complex lower surface and a pin projecting downwardly from that surface into a bore in a flat surface of a box-like lower part. The parts are assembled by press fitting the pin on the upper part into the bore in the lower part. The surfaces of the two parts are then close together and the pin and bore inaccessible. These parts were welded together according to the present invention by pressing a sonic source against an accessible surface of the upper part remote from the pin and bore interface, it being observed that upon energization of the source the parts were firmly welded together at the pin and bore interface.

In the above examples, the present invention permits sonic welding of two parts at an interface completely remote from any accessible surface on either part, a result not achieved in the prior art.

The method of the invention has also been used to butt weld a beam from two relatively thick plastic bars. The beam being L-shaped in cross section. In this instance, the bars were clamped together in an L configuration and a sonic source pressed against one bar transverse to and substantially spaced from the interface between the bars. Upon energization of the sources the parts welded together all along their interface.

In an extension of this example, three bars were then clamped together to form a U-shaped beam. Sonic energy was then introduced into the central bar. The bars were instantaneously welded together at their interfaces. Thus, the method of the present invention enabled a single sonic energy source to simultaneously weld two widely spaced, elongated and completely unrelated interfaces, a result unobtainable in the prior art. Furthermore, the material welded in this example was somewhat flexible polyethelene for which no known practical solvent exists. Thus, the present method permits assembling complex constructions of this material which were previously impossible to weld or glue together.

As above indicated, welding takes place only at such juxtaposed surfaces as are maintained in intimate contact during the time that the sonic energy is introduced into the assembly. Thus, when the method was used to butt weld two halves of a thermoplastic toy whistle, a plastic ball disposed loosely in the hollow formed between the two abutting halves, did not weld to either whistle half. The ball was observed to bounce freely around within the hollow of the whistle during the application of the sonic energy.

Similarly, when the new method was used in welding together a container comprising upper and lower portions forming a cylindrical opening within which a spool was loosely received for free rotation relative to the body of the container, the spool remained freely rotatable after the juxtaposed peripheral surfaces of the upper and lower portions were sonically welded.

The method of the present invention, in addition to affording the advantages apparent in the above examples also permits increasing the amount of sonic power that can be delivered to a particular interface without burning the part at the surface where the power is coupled into it. That is, since we have discovered and taught that a weld can be effected at an interface remote from the location at which the sonic power is introduced, sonic power may now be coupled into a part over a large area as compared to the localized area immediately adjacent an interface at which the sonic power was introduced according to the prior art. Since, according to our invention, the power may now be coupled into the part over a large area, a large amount of power may be transmitted through the part to a particular interface, yet the amount of power coupled into the part per unit surface area is below that which will burn the part. Thus, by the present method, parts made of materials melting only upon the development or dissipation of excessively large amounts of heat, (e.g., thermoplastic materials having high thermal conductivities so that the heat developed by friction at the interface is rapidly conducted away from the interface; or, materials having high melting points) may be welded together sonically and without burning the parts. parts.

That is, by our method, sonic power may be introduced over a large surface area of an assembly, e.g. areas A and B of FIGURES 1 through 3 at a power level per unit area below that which will melt that surface (or would melt an interface between parts having the same area). This sonic power is transmitted with little loss to the interfaces between the parts of the assembly, e.g. interfaces 26 and 28 of FIGURE 1 and interfaces 36 and 38 of FIGURES 2 and 3. These interfaces where the power dissipates have a smaller total area than that where the power was introduced. Thus, the power per unit area at the interfaces is great enough to melt them.

In the above examples, the small area tip 40 of the horn 24 of a high power sonic source was pressed directly against one of the parts to be welded so as to positively couple the sonic power into the part for transmittal to the sealing interfaces. Best results were achieved when the surface of the tip of the horn conformed to an equal area of the surface of the part; the intimate contact, thus effected, providing the most efficient transfer of power from the source to the part. For example, in the above-described welding of spherical balls 30, the best welds were obtained when the horn tip 40 was shaped to conform to the spherical surfaces of the balls as shown in FIGURES 2 and 3.

The invention was also carried out using couplers, such as a film of Mylar (Du Pont's brand of sheet polyethylene terephthalate) disposed between the horn tip and the part and no appreciable difference in the quality of the resulting weld was observed.

Although as previously indicated, it is necessary for the successful practice of the invention to hold the interfaces of the parts in intimate contact during welding, it was found in many of the above-described examples that such could be accomplished satisfactorily simply by manually pressing the horn of the sonic source firmly against one of the parts and providing a backing, such as a base surface, for the other part.

A sonic power source that has been found effective for practicing the invention is disclosed in the co-pending U.S. patent application of Stanley E. Jacke et al. entitled Sonic Disperser, Serial No. 125,568, filed July 20, 1961 now abandoned in favor of application Serial No. 384,025 of July 13, 1964 of the same title, filed by the same applicants. A sonic energy source of the form disclosed in the above-identified application was found to give satisfactory results when operated at a frequency of 20,000 cycles per second and powers of 75 to 100 watts. The tips of the horns used were circular and 3/8 to 5/8 inches in diameter. The method of the invention may, however, be carried out at different frequencies and power levels and other sonic power sources may be used. For example, although the invention method has been described throughout with reference to a high intensity sonic power source having a concentrating horn, any sonic source capable of coupling the requisite amount of sonic power into the assembled parts may be employed.

We do not wish to be bound by any theory as to how or why the above disclosed invention method works. However, it is our belief that the power coupled into the one part at a location remote from the interfaces of the sealing surfaces travels through that part substantially instantaneously to each of the interfaces where it is converted into heat through the rubbing and beating together of the intimately contacting surfaces of the two parts. The heat melts the material at the interfaces and causes it to flow together to form, upon cessation of the introduction of power, a weld. The mixing of the material following its melting is augmented and enhanced by the continued relative movements of the parts.

We have found, however, that the best welds are achieved when the sonic vibrations are introduced in a manner that produces a relatively greater amount of rubbing rather than beating at the interfaces 36 and 38 as shown in FIGURES 2 and 3. Thus, interfitting conical surfaces where the rubbing motion in one direction also produces forces causing more intimate contact at the interface are preferred.

Referring to FIGURES 4 and 5, the invention may also be carried out by providing a part 50 with a welding boss 52 having a special surface 54 for the application of the ultrasonic energy. This boss should be oriented with respect to the sealing interface so as to provide the preferred rubbing action. After sealing, the boss may be removed, as indicated in FIGURE 5, by cutting, knocking off, grinding, or the like.

It should be understood that the term thermoplastic as used herein and in the claims is meant to include any material which is solid or semi-solid at normal temperatures and melts or becomes plastic upon the application of heat. The method is particularly applicable to welding organic thermoplastics such as polyethelene and polystyrene. "Relatively stiff" as used herein refers to any rigid or semi-rigid workpiece capable of transmitting sonic power to a remote interface thereof to be sealed.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. The method of fusion welding relatively stiff thermoplastic parts, comprising the steps of:
   (A) holding at least two of said parts in intimate contact at at least one interface; and,
   (B) introducing sonic energy into a surface of at least one of the parts at a power level per unit area below that which would cause that surface to melt and at a total power level sufficient, when the sonic energy is concentrated and dissipated at the interfaces of the parts to cause them to melt and fuse to form a weld.

2. The method of fusion welding relatively stiff thermoplastic parts, comprising the steps of:
   (A) holding at least two of said parts in intimate contact at at least one interface; and,
   (B) introducing sonic energy into a surface of at least one of the parts over an area substantially greater than the total area of intimate contact of said parts to thereby effect a fusion weld between the parts.

3. The method of fusion welding relatively stiff thermoplastic parts, comprising the steps of:
   (A) holding at least two of said parts in intimate contact at at least one interface; and
   (B) introducing sonic energy into a surface of at least one of the parts at a power level per unit area below that which would cause that surface to melt and over an area substantially greater than the total area of intimate contact of said parts to thereby effect a fusion weld between the parts.

4. The method of fusion welding relatively stiff thermoplastic workpieces, comprising the steps of:
   (A) holding adjacent surfaces of a said workpiece to be welded in intimate abutting contact;
   (B) introducing sonic power into the workpiece at a position remote from said adjacent surfaces, said power being transmitted along a path through the workpiece substantially departing from a straight line to cause relative vibratory motion at said adjacent surfaces to produce frictional heating of said surfaces and thereby effect a fusion weld.

5. The method of fusion welding relatively stiff thermoplastic workpieces, comprising the steps of:
   (A) holding adjacent surfaces of a said workpiece to be welded in intimate abutting contact;
   (B) introducing sonic power into the workpiece along an axis offset from said adjacent surfaces, said power being transmitted through the workpiece away from said axis along a path substantially departing from a straight line to cause relative vibratory motion at said adjacent surfaces to produce frictional heating of said surfaces and thereby effect a fusion weld.

6. A method of joining together two relatively stiff thermoplastic parts each having a plurality of sealing surfaces, comprising the steps of:
   (A) bringing two said parts together to abut each of the sealing surfaces on one of said parts against a sealing surface on the other of said parts; and,
   (B) while maintaining said parts in intimate contact at each of said abutting sealing surfaces;
   (C) introducing ultrasonic energy into at least one of said parts at a location thereon spaced from all of said interfaces to cause the parts to undergo relative vibratory movement at said sealing surfaces thereby to cause said sealing surfaces to flow together to form a weld.

7. The method of fusion welding relatively stiff thermoplastic workpieces, comprising the steps of:
   (A) holding at least two surfaces of a said workpiece to be welded in intimate abutting contact;
   (B) introducing sonic power into the workpiece at an exposed surface thereof remote from the abutting surfaces thereof and along an axis offset from said abutting surfaces, said power being transmitted through the workpiece along paths substantially departing from a straight line to cause relative vibratory motion at said abutting surfaces to produce frictional heating at said surfaces and thereby effect a fusion weld.

8. The method of fusion welding relatively stiff thermoplastic parts comprising the steps of:
 (A) providing a thermoplastic part with an integral boss for the application of sonic energy to the part;
 (B) holding a surface of the part in abutting contact with another part; and,
 (C) applying sonic energy to the boss whereby the sonic energy is transmitted through the boss into and through the part integral therewith to the abutting surfaces of the parts causing them to melt and fuse together.

References Cited by the Examiner
UNITED STATES PATENTS

| | | | |
|---|---|---|---|
| 3,022,814 | 2/1962 | Bodine. | |
| 3,062,695 | 11/1962 | Hull | 156—73 |

EARL M. BERGERT, *Primary Examiner.*